United States Patent [19]

Pratt et al.

[11] Patent Number: 5,038,014
[45] Date of Patent: Aug. 6, 1991

[54] FABRICATION OF COMPONENTS BY LAYERED DEPOSITION

[75] Inventors: Vanon D. Pratt, Hamilton; Wilbur D. Scheidt; Eric J. Whitney, both of Cincinnati, all of Ohio

[73] Assignee: General Electric Company, Cincinnati, Ohio

[21] Appl. No.: 443,830

[22] Filed: Dec. 1, 1989

Related U.S. Application Data

[63] Continuation of Ser. No. 307,795, Feb. 8, 1989, abandoned.

[51] Int. Cl.⁵ ............................................. B23K 26/00
[52] U.S. Cl. .............................. 219/121.64; 29/527.2;
 29/889.71; 264/25; 264/40.1; 264/248;
 264/308; 416/229 R; 219/121.66; 219/121.84;
 419/7; 419/52; 425/381; 425/375; 427/531;
 427/189; 427/190; 427/195
[58] Field of Search ............... 416/229 R, 229 A;
 427/53.1, 189, 190, 195; 219/76.1, 121.66,
 121.64, 121.85; 419/7, 52; 264/40.1, 25, 310,
 248, 308; 425/381, 87, 375; 29/402.09, 402.11,
 402.13, 402.16, 402.18, 402.19, 527.2

[56] References Cited

U.S. PATENT DOCUMENTS

| 3,608,976 | 9/1971 | Zugelder | 416/229 X |
|---|---|---|---|
| 3,706,511 | 12/1972 | Abbott | 416/229 |
| 3,708,060 | 1/1973 | Ben-Natan | 29/156.8 R X |
| 4,023,249 | 5/1977 | Darrow et al. | 29/889.721 |
| 4,023,251 | 5/1977 | Darrow | 29/889.721 |
| 4,102,663 | 7/1978 | Jung | 427/189 X |
| 4,284,443 | 8/1981 | Hilton | 29/156.8 P X |
| 4,657,171 | 4/1987 | Robins | 29/402.09 X |
| 4,665,492 | 5/1987 | Masters | 264/40.1 X |
| 4,680,072 | 7/1987 | Farrell | 427/195 X |
| 4,726,101 | 2/1988 | Draghi et al. | 29/402.11 X |
| 4,730,093 | 3/1988 | Mehta et al. | 427/53.1 X |
| 4,808,055 | 2/1989 | Wertz et al. | 29/156.8 B X |
| 4,822,248 | 4/1989 | Wertz et al. | 29/402.18 X |
| 4,832,982 | 5/1989 | Mori et al. | 427/53.1 |

FOREIGN PATENT DOCUMENTS

| 588206 | 12/1959 | Canada | 419/7 |
|---|---|---|---|
| 2929731 | 2/1981 | Fed. Rep. of Germany | 419/7 |
| 177107 | 9/1985 | Japan | 419/7 |

Primary Examiner—Mark Rosenbaum
Assistant Examiner—Frances Chin
Attorney, Agent, or Firm—Jerome C. Squillaro; Carmen Santa Maria

[57] ABSTRACT

A component is fabricated by depositing a succession of overlying beads of a material, the pattern and position of the beads being assigned the proper characteristics of the corresponding section of the desired component. Shape definition is accomplished by characterizing the component as a series of sections or slices having the thickness of the bead, and programming a computer-controlled deposition head to deposit a succession of beads with the respective patterns and positions. Deposition is preferably by precision laser welding. Complex shapes having properties comparable to properties of forged or cast material are readily prepared. The material used in successive beads may be varied, producing a component of graded composition to achieve particular properties in various regions.

22 Claims, 3 Drawing Sheets

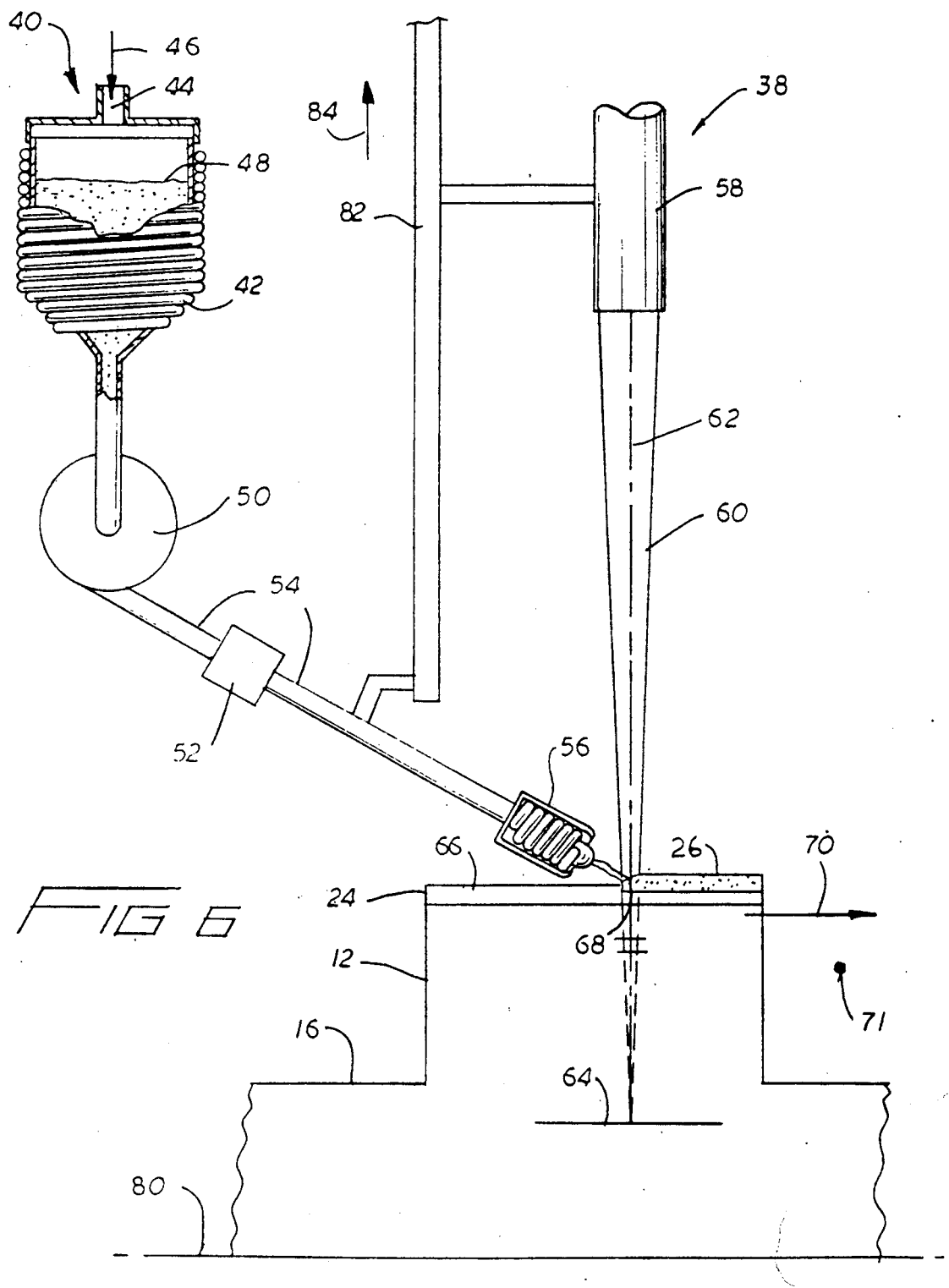

FABRICATION OF COMPONENTS BY LAYERED DEPOSITION

This is a continuation of application Ser. No. 307,795, filed Feb. 8, 1989 now abandoned.

BACKGROUND OF THE INVENTION

This invention relates to the fabrication of components, and, more particularly, to fabrication by controlled deposition of layers of the constituents.

Improvements in manufacturing technology and materials are the keys to increased performance and reduced cost for many articles. As an example, continuing and often interrelated improvements in processes and materials have resulted in major increases in the performance of aircraft gas turbine engines.

An aircraft gas turbine or jet engine draws in and compresses air with an axial flow compressor, mixes the compressed air with fuel, burns the mixture, and expels the combustion product through an axial flow turbine that powers the compressor. The compressor includes a disk with blades projecting from its periphery. The disk turns rapidly on a shaft, and the curved blades draw in and compress air in somewhat the same manner as an electric fan.

In current manufacturing practice, the compressor is made by forging the compressor disk as a single piece with slots at the periphery. The compressor blades are individually cast or forged to shape with a root section termed a "dovetail" that fits into the slots in the disk. Assembly is completed by sliding the dovetail sections of the blades into the slots in the disk. If a blade does not fit properly, fails or is damaged during service, it may be readily replaced by reversing the assembly procedure to remove the blade, and providing a new blade.

More recently, it has been proposed to form the blades integrally with the disk, in a combination termed a "blisk". The blisk approach to manufacturing offers the potential for increased performance through reduced weight. Such an article can be cast or forged as a large disk with an excess of metal at the periphery. The blades are then machined from the excess metal, integrally attached to the disk. The final product is expensive to produce, as it requires extensive high-precision machining operations. An error in machining even one of the blades may result in rejection and scrapping of the entire blisk.

Replacement or repair of a damaged blade portion of the blisk presents a difficult problem with this manufacturing approach. If all or a portion of a blade breaks off due to ingested foreign objects during operation, for example, the blisk becomes unbalanced. There is no method presently known to repair the damaged blade in a manner that does not result in reduced performance, and there is a need for such an approach. Desirably, such an approach would be utilized in manufacturing the blisk to reduce its cost. The present invention fulfills this need, and further provides related advantages.

SUMMARY OF THE INVENTION

The present invention provides a process for fabricating and repairing articles and portions of articles such as the blades of blisks. The process produces an article comparable in properties with cast or forged articles, but with the additional benefit of being integrally formed with another component. When the process is used to repair a damaged article that was previously manufactured by the same process, the repaired article is virtually indistinguishable from the original. The process permits excellent control over shape and configuration of simple and complex shapes, and also permits gradation in composition throughout the article. The composition variation control in turn provides designers with the opportunity to design an article with specific properties suited to the performance requirements of different regions.

In accordance with the invention, a process for fabricating an article comprises the steps of depositing a first bead of a material in a pattern and width of a first cross section of the article; depositing a second bead of a material overlying the first bead of material, in a pattern, position, and width relative to the first bead, of a second cross section of the article, the second cross section being taken at a location spaced from the first cross section by the thickness of the first bead; and repeating the step of depositing a second bead in a plurality of deposition steps, each successive bead being deposited in a pattern, position, and width relative to the previously deposited bead, of the next cross section of the article taken at a location spaced from the prior cross section by the thickness of the previously deposited bead, until the entire article is complete.

Alternatively stated and in another embodiment, a process for fabricating an article comprises the steps of characterizing the article as a plurality of parallel sections, each section having a pattern and position, and each section being displaced from adjacent sections by the thickness of a bead of a material; and depositing a succession of beads of the material overlying each other, each bead having a pattern and position corresponding to that of the respective section determined in the step of characterizing.

In accordance with a preferred specific application of the invention, a process for fabricating a compressor blade that is integral with a compressor disk comprises the steps of furnishing a compressor disk having a substrate surface at its periphery; depositing a first bead of a material onto the substrate surface, the bead having the pattern and position of the compressor blade adjacent the compressor disk; and depositing a succession of beads of a material, each bead overlying the previously deposited bead, and each bead having the pattern and position of the corresponding portion of the compressor blade. If the section of the blade is thicker than a single bead, two or more side-by-side beads may be deposited to make a single layer, and then additional sets of beads deposited overlying that layer to form subsequent layers.

Many articles may be analyzed as being an assembly of sections or slices parallel to each other. The article is then uniquely defined by specifying the pattern of each section, that is, its shape and size, and the position of each section, that is, its relationship to the adjacent sections. The pattern of each section may be amenable to formation by a bead of deposited material, where a bead is an elongated deposit typically formed by moving the substrate relative to the heat source. Where such is the case, the article may be formed by depositing a bead (or several side-by-side beads, if necessary) in the shape of the pattern of a section, and then incrementing the deposition apparatus upwardly by the bead height, thereafter depositing another bead having the pattern of the next section and the required position in relation to the previously deposited bead. The process is repeated as many times as necessary to form the article.

For example, certain compressor blades are relatively thin in width, on the order of ⅛ inch, a readily deposited bead width for a laser welding apparatus. Each section is deposited in a single pass of the laser welding apparatus. Upon completion of the pass, the weld head is incremented upwardly by the height of the bead, typically about 0.015 inch, and the next section is deposited in a single laser welding pass. During each pass, the laser welding deposition unit melts the upper portion of the previously deposited bead (or substrate, in the first pass), and adds more material through its powder feed to form the overlying bead. The newly added material of the overlying bead and the melted portion of the previously deposited bead partially intermix and solidify together, ensuring a continuous, strong structure through the beads.

A wide variety of shapes and sectional configurations can be made by this approach. Solid figures are made by laying down beads one above the other. Increased thickness is achieved by laying down several beads in a side-by-side fashion in each layer, and then adding more beads above that layer. Parts of varying thickness are made by changing the number of beads in a layer. Hollow airfoil or other hollow shapes are made by depositing the bead in the shape of the outer wall, and then depositing additional beads one on top of the other. Hollow sections with internal structure, such as cooling passages, are made by adding internal ribs and the like to each section, in addition to the outer walls. Virtually any shape can be defined as a collection of beads, and the present approach has the versatility to make such a wide variety of shapes. Typical aircraft engine applications include compressor blades, turbine blades, fan blades, tubes, and boxes, with the later being square, rectangular, or of irregular cross section.

The preferred pieces made utilizing the invention, compressor blades, are typically a complex airfoil shape, involving a two-dimensional curvature. One dimension of curvature is readily introduced into the article by moving the part relative to the weld deposition head in a curved path during each pass, with movement achieved by moving the part, the weld deposition head, or both. The other dimension of curvature is introduced by displacing each section laterally by a small amount from the preceding section.

The control of the deposition is accomplished by numerically characterizing the shape of the article such as a blade from drawings or a part prepared by more conventional methods such as machining. Once the shape of the part is numerically characterized, the movement of the part (or equivalently, the deposition head) is programmed using available numerical control computer programs to create a pattern of instructions as to the movement of the part during each pass, and its lateral displacement between passes. The resulting article reproduces the shape of the numerical characterization quite accurately, including complex curvatures of an airfoil or the like.

The laser welding technique melts powders in a feed and projects the molten material onto a surface. The approach is controllable and yields reproducible, precise results. In fabricating an article by the present approach, the composition of the powder feed may be maintained constant throughout the entire article. Alternatively, the composition of the powder feed may be intentionally varied within any bead or as between successive beads, to produce controllable composition variations throughout the article. For example, in a compressor blade a strong, tough alloy composition may be used near the base and a hard, wear resistant or abrasive alloy near the tip.

For the repair of articles, it is necessary only to repeat a portion of the deposition sequence from the previously developed characterization. For example, if a compressor blade breaks near the midpoint, it is necessary only to grind a flat surface onto the blade corresponding to the closest remaining undamaged section, and then to repeat the computer controlled deposition of the remainder of the blade. The repaired blade is virtually indistinguishable from the originally fabricated blade, as it is accomplished by the same apparatus and with the same shape-controlling pattern. The repaired portion has no macroscopically detectable bond line after finishing or discontinuity to the base portion of the blade, because the two are welded together in the same manner employed when the blade was manufactured.

A wide variety of materials may be deposited using the approach of the invention. For example, titanium alloys, nickel alloys, cobalt alloys, iron alloys, ceramics, and plastics may be deposited.

The present invention provides an important advance in the art of fabrication. Complex pieces may be fabricated integrally to another part, with no macroscopically detectable bond line after machining, or use of fasteners. There is great versatility as to both shape and local composition of the article. Repair is facilitated by using the same procedure as in initial fabrication, with computer controlled deposition. Other features and advantages of the present invention will be apparent from the following more detailed description of the preferred embodiment, taken in conjunction with the accompanying drawings, which illustrate, by way of example, the principles of the invention.

BRIEF DESCRIPTION OF THE DRAWINGS

FIG. 6 is an elevational view of a laser welding apparatus for practicing the process of the invention.

DETAILED DESCRIPTION OF THE PREFERRED EMBODIMENT

Figure 1:
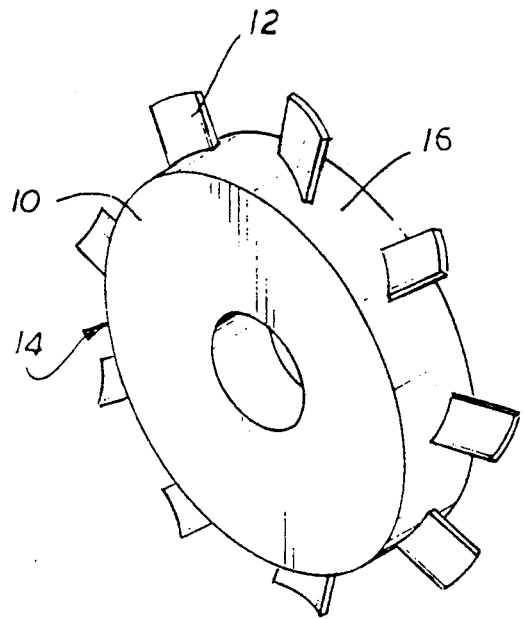
FIG. 1 is a perspective drawing of an integral compressor disk and blades, or blisk.

The present invention is preferably embodied in a process for fabricating or repairing a compressor blade integral with a compressor disk, although the invention is not so limited. Referring to FIG. 1, an integral combination of a compressor disk 10 and a plurality of compressor blades 12 constitutes an integral blade/disk unit or blisk 14. The disk portion 10 is of a generally cylindrical, wheel shaped configuration having a rim 16 at the periphery. The plurality of blades 12 are joined to the disk portion 10 at the rim 16, in the correct position and orientation to catch and compress air as the blisk 14 turns. (In FIG. 1, only a few blades 12 are illustrated around the periphery of the disk portion, for clarity of illustration. Normally, many more closely spaced blades are present.)

Figure 2:
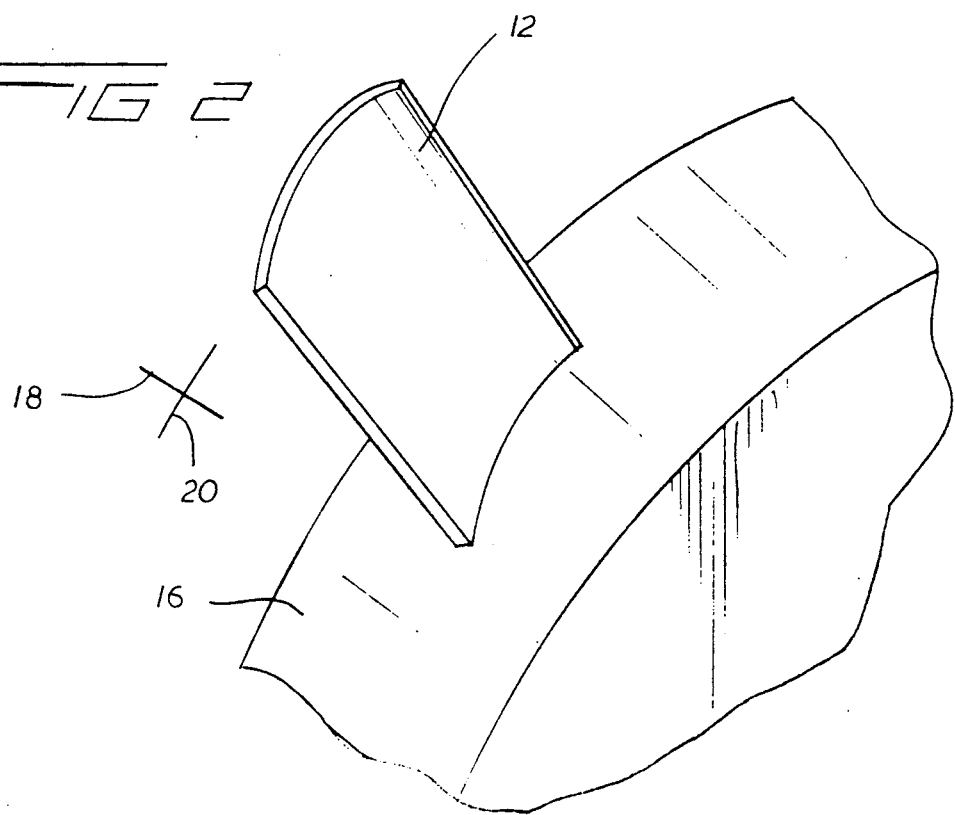
FIG. 2 is an enlarged perspective view of the blade portion of FIG. 1.

FIG. 2 illustrates a blade portion 12 in greater detail. The blade portion 12 is joined to the rim 16 integrally. That is, the blade is not formed as a separate piece and then joined to the rim and the disk. The blade is structurally integral with the rim 16, with a continuous structure progressing from the rim 16 to the blade 12.

The blade 12 is normally of a complex airfoil shape determined by detailed calculations of the optimal approach for compressing the air. The axial compressor of the engine normally includes numerous stages of compressors, and the precise shape and size of each blade portion varies from stage to stage. Generally, however, the blade portion 12 is curved in two directions. That is, if a perpendicular coordinate geometry is defined by a radius 18 of the disk 10 and a circumferential tangent 20 to the rim 16, at least some portions of the blade 12 will be curved with respect to each of the radius 18 and the tangent 20. Moreover, the chord length and curvature are not constant throughout the blade, with the curvature usually varying across the span of the airfoil and along its length, and the chord varying along the length. The fabrication of such complex curved shapes by conventional machining, forging, or casting procedures requires careful attention and is costly.

Figure 3:
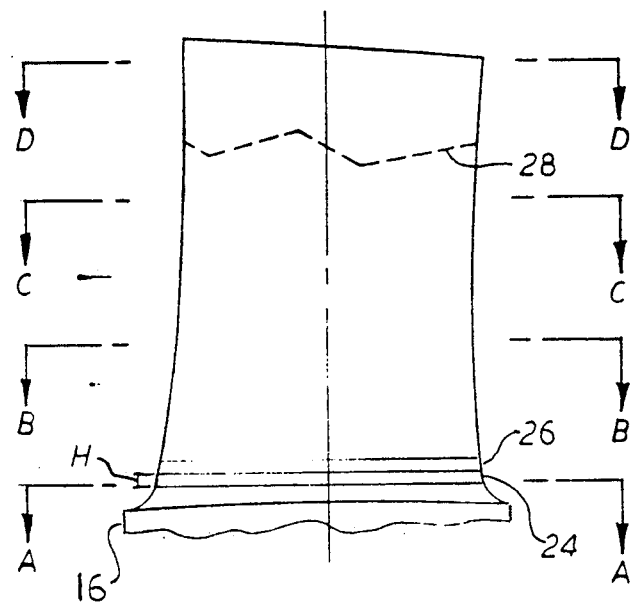
FIG. 3 is an elevational view of the blade of FIG. 2.
Figure 4:
FIG. 4 is an end plan view of the blade of FIG. 2.

The structure of the blade portion 12 may be characterized with section lines taken through the blade 12 normal to the radial direction 18. Four exemplary sections A, B, C, and D are indicated in FIG. 3 at increasing radial distances. The complex curvature of the blade 12 can also be seen in the end view of FIG. 4.

Figure 5:
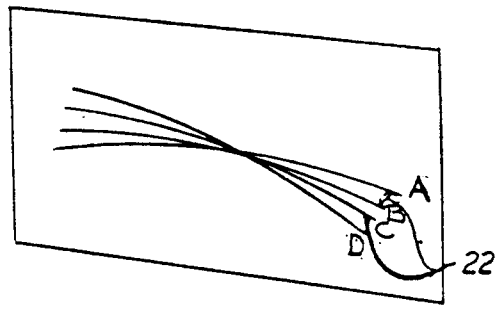
FIG. 5 is a diagrammatic representation of the patterns of four representative beads A, B, C, and D as indicated in FIG. 3.

FIG. 5 illustrates the pattern and relative position of the section lines A, B, C, and D in an abstract sense, apart from their relationship to the blade 12. The shape of the blade at section A is as indicated by the pattern of A, the shape of the blade at section B is as indicated by the pattern of B, and so forth. In the present approach, the blade 12 is fabricated by depositing a first bead of metal along the pattern of A, a second bead of metal overlying the first bead, but following the pattern of B, and so forth. The thickness of the blade at section A is usually greater than the thickness of the blade at section B, because a filet of increased width is normally formed near the bottom or root of the blade. Thus, for example, adjacent the substrate the blade may be made 4 beads wide, the next layer up may be 3 beads wide, the next layer 2 beads wide, and succeding layers 1 bead wide. The thickness of the blade at different layers or sections may be controllably varied by changing the number of beads in each layer.

The shape of the blade (as distinct from its thickness) is varied by changing the shape and pattern of the bead. The bead along pattern B has a shape different from the bead along pattern A, as is apparent from the different curvature of patterns A and B of FIG. 5. Curvature may also be controllably varied by displacing a bead from the underlying, previously deposited bead. For example, pattern B is laterally displaced from pattern A by a displacement 22, which varies with location along the bead. That is, pattern B not only has a different shape or pattern, but also a different position in space in respect to pattern A. The bead following pattern B is therefore not directly overlying the bead following pattern A, but is slightly displaced to a different position. The displacement may also be along the length of the pattern, creating a sweeping shape to the blade. Although the illustrated displacement may appear to be rather large, it will be recalled that illustrative patterns A and B in the drawings are taken at well-separated sections for purposes of illustration. In reality, the displacements H between two adjacent beads is small, typically about 0.015 inch, and well within the limits of maintaining continuity of the blade 12.

To fabricate the blade 12, the shape of the blade is first characterized in a section by section manner. That is, the pattern and position of each section is carefully recorded, either from a drawing, a calculation, or a previously prepared part. For each section, the necessary information can be obtained in one of two ways. In a relative positioning method, it is necessary to know (1) the pattern of the section, that is, the coordinates of each point along the pattern line (such as B) and (2) the relative position of the section in respect to the previous section (such as the displacement 22 between pattern B and pattern A, on a point by point basis. Alternatively, in an absolute positioning method, it is necessary to know the position of each point of deposition of bead material in respect to some external frame of reference. In either case, the numerical information which, in total, defines the shape of the blade in three dimensions is readily determined and stored in the manner used for numerically controlled metalworking machinery.

After the detailed shape of the blade or other article is defined, metal beads are deposited in an overlying fashion to reproduce the stored numerical form. It is necessary to utilize apparatus which produces a well defined bead, and is also controllable to follow the required numerical form. A laser welding apparatus has been developed to meet these requirements, and will be described in detail below. The present invention does not, however, encompass the apparatus itself, but instead relates to a method of use.

More specifically, a first bead 24 is deposited along the pattern A, upon the rim 16 as a substrate. Enough heat is transferred into the rim 16 to cause some surface melting of the substrate material, and the material of the bead 24 is predominantly molten when it reaches the substrate. The molten materials intermix and quickly solidify. The first bead 24 is thereby fused into the rim 16 to form an integral bond therewith. No bond line or lamination is macroscopically visible or detectable. After final machining and finishing, for all practical purposes, the first bead 24 is fully integral with the rim 16. If the compositions of the material of the rim 16 and the first bead 24 are different, there will be some intermixing of the compositions in the melted zone.

After completion of the pass that forms the first bead 24, the deposition apparatus performs a second pass to deposit a second bead 26. In the second pass, the part follows the pattern of the next section up from section A, which generally will have a slightly different pattern (curvature), position, and length, and may be laterally displaced, which parameters had been previously determined and stored. The distance between each section in characterizing the shape of the blade 12 is usually taken to be about the height H of the bead that is deposited by the deposition apparatus, which is dependent upon the type of apparatus, the material being deposited, the travel rate, and other factors, but for laser welding is typically about 0.015 inch. The first bead 24 is locally partially melted as the second bead 26 is deposited thereover. The second bead 26 is thus fused into the underlying first bead 24 in the same manner described above for the fusing of the first bead 24 with the substrate, again resulting in a fully integral structure.

This procedure of depositing an overlying bead is repeated until the entire height of the blade 12 has been formed. By depositing the beads following the patterns previously determined, the blade is accurately reproduced. Any roughness on the surface of the blade due to imperfect registry of successive blades can be ground and polished away, completing the manufacture of the integral blade.

The present approach offers important advantages in addition to the versatility and integral construction indicated previously. The material feed into the deposition apparatus can be varied along the length of any one bead, or between successive beads, to vary the composition of the article between different regions thereof. Because the composition of the deposited material, like the shape, may be numerically controlled, it is possible to form fields of particular composition to achieve particular purposes. For example, the portions near the base of the blade 12 (i.e., section A) may be made strong and ductile, while the portions near the tip of the blade 12 (i.e., section D) may be made hard and wear resistant or abrasive. Portions most subject to aerothermal heating can be given a particular composition. Moreover, the microstructure of the blade is unlike that of a blade produced by any other method, having a successively remelted structure.

Repair of the blade 12, as after undergoing damage in use, is also facilitated by the present approach. If, for example, the tip of the blade 12 were broken off along a jagged line indicated at numeral 28 in FIG. 3, repair is accomplished by grinding the blade 12 back to a section at which it is determined that there has been no damage. Such a section might be section C. Deposition of a new tip overlying section C would then be performed, in exactly the same manner as if the blade were first being manufactured using this method. The numerical characterization of the blade having been retained for such possibility, the new tip can be deposited as identical to the original damaged tip. Any improved characteristics, such as a new, improved airfoil shape or a different material composition, could be incorporated, if such modification would not alter the performance of the blisk 14 because the other blades were not given the same modification. In any event, because of the melting and fusion of succeeding beads, the repaired blade would remain fully integral along its length and have no plane of significant weakness.

Many different techniques are known to deposit beads of metal and other substances. Some produce a diffuse spray, and such techniques are generally not applicable to the practice of the present invention. A particularly satisfactory apparatus for practicing the present invention has been found to be a laser welding apparatus, in which a laser beam melts a pool on the surface at which it is directed, and a finely divided feed material is fed to the melted region to add a new deposit of material, termed a "bead". By moving the part along a controlled path, a carefully defined and shaped bead is formed.

An apparatus 38 for performing controlled laser welding deposition of beads, and useful in practicing the present invention, is illustrated in FIG. 6. This apparatus is described in greater detail in U.S. Pat. No. 4,730,093, whose disclosure is herein incorporated by reference. The practice of the invention is not, however, limited to use of this particular apparatus.

The apparatus 38 includes an enclosed powder reservoir shown generally at 40, heated by heating coils 42 for the purpose of controlling the moisture content at a low level in the powder. Also included is a gas inlet port 44 through which a preferably dry inert gas such as argon, represented by arrow 46, is introduced to maintain powder 48 in reservoir 40 under pressure and to assist in powder transport. Associated with the powder reservoir is a mechanical, volumetric powder feed mechanism such as powder feed wheel 50 of a type commercially available. For example, the type used in one form of the apparatus of the present invention was a modified Metco powder feed "L" type wheel.

Downstream of wheel 50 is a vibrator such as air actuated vibrator 52 associated with conduit 54 to inhibit powder particles moving in conduit 54 from adhering one to the other or to walls of the conduit 54. Conduit 54 terminates in a water-cooled powder delivery nozzle 56 which directs the powder, assisted by the pressurized inert gas, in a consistent flow, such as toward a substrate or previously deposited bead on a blade 12. It has been found that reflection from the laser beam can result in clogging of powder passing through nozzle 56. Therefore, such a nozzle, preferably having at least a tip portion made of a material, such as copper or aluminum, which is highly reflective to the wavelength of the laser used, is fluid cooled, as by water, to avoid such problem and to assist in a consistent flow of powder. Such consistent flow of powder results from the combination of use of powder maintained in a low moisture condition, under a positive inert gas pressure, being fed by a mechanical volumetric powder feed mechanism along with a powder vibrator, and a cooled nozzle through which the powder passes toward the article surface in the laser beam spot.

It is contemplated that there may be additional conduits 54 of similar configuration spaced around the delivery point of the powder, should that be desired. The powder streams delivered by the several conduits 54 would be positioned so that there was convergence at the surface of the workpiece.

The apparatus 38 includes a laser 58 emitting a beam 60 having a beam axis 62. The laser 58 has a power output sufficient to accomplish its melting functions. An operable embodiment of the invention has used a 5 kilowatt (kW) carbon dioxide laser to manufacture compressor blades, but larger or smaller lasers may be used as necessary. The beam 60 has a focal plane 64 beneath the surface 66 upon which the bead is to be deposited, to provide at the surface a beam spot 68 of a size typically in the range 0.005–0.2 inches, although again these dimensions are illustrative and not restrictive. The laser energy is ordinarily applied with a power density of from about $10^3$ to about $10^6$ watts per square centimeter to melt a pool of material conincident with the beam spot 68.

The bead of deposited material is deposited by feeding powder through the conduit 54 into the molten pool at the beam spot 68. The powder is fed from nozzle 56 at an angle preferably in the range of about 35–60 degrees from the article surface, and most preferably in the range of about 40–55 degrees. An angle of greater than about 60 degrees makes it difficult for the nozzle and powder to avoid premature interaction with the laser beam, and less than about 35 degrees makes it difficult to deliver the powder concurrently with the laser beam at the spot desired on the article surface. As relative lateral movement is provided between the laser beam spot and the article carrying its superimposed powder, progressive melting, cooling and solidification of the molten interaction zone occurs, producing a bead.

The blisk 14, of which the blade 12 and the rim 16 are a part, is supported on a movable support 80, which moves the blade 12 in two directions, the x direction 70 (and the −x direction) and the y direction 71 (out of the plane of the illustration of FIG. 6, and the −y direction into the plane of the illustration of FIG. 6, as illustrated by the dot at numeral 71). By controlling the combination of x and y direction movement of the support 80, while maintaining the conduit 54 and laser 58 at constant height, a well-defined bead is deposited having the pattern required for that particular section of the blade 12.

The conduit 54 and laser 58 are rigidly supported on an apparatus support 82. The support 82 is movable in the z direction 84 (and the −z direction), to raise or lower the conduit 54 and the laser 58. Through the supports 80 and 82, the laser 58 and conduit 54 may be moved relative to the blade 12 in all three dimensions. By controlling the combination of x and y direction movement of the support 80, while maintaining the conduit 54 and laser 58 at constant z height, a well-defined bead is deposited having the pattern required for that particular section of the blade 12. (Equivalently, the combination of relative x, y, and z movement could be supplied by moving the support 82 in the x and y directions, and the support 80 in the z direction, or any other similar combination of movements.)

At the completion of a bead (for example, the first bead 24), the apparatus 38 is incremented upwardly to raise the conduit 54 and the laser 58 by an amount typically chosen to be the height or thickness of the bead H, so that another bead (for example, the second bead 26) may be deposited overlying the first bead 24. FIG. 6 illustrates the deposition process at a stage whereat the first bead 24 has been completed, and the second bead 26 is partially deposited. As the second bead 26 is deposited, the upper portion of the first bead 24 is remelted, ensuring the mixing and structural continuity of the two beads 24 and 26.

The following examples are presented to illustrate aspects of the invention, and should not be taken as limiting of the invention in any respect.

EXAMPLE 1

The apparatus previously described was utilized to form a compressor blade integral with a substrate. The beam of a 3 kW carbon dioxide laser was focused to a spot diameter of 0.356 centimeters, and thus a power density of 30 kW per square centimeter. A doubly curved compressor blade having the general configuration illustrated in FIGS. 1-5 was deposited. The length of the blade was about 3 inches. The height of each bead was about 0.015 inch. A total of 200 passes was required to fabricate the blade, at a linear traverse rate of the substrate relative to the laser beam of 50 inches per minute as the powder was deposited. The deposited alloy was Ti-6Al-4V, furnished to the conduit as −35/+230 mesh powder, at a feed rate of about 10 grams per minute, and the substrate was Ti-6Al-4V. The blade and surrounding area were within an atmosphere of argon during deposition.

EXAMPLE 2

Example 1 was repeated, except that the deposited alloy was Inconel 718 alloy; the substrate was Inconel 718 alloy, and the traverse rate was 80 inches per minute.

EXAMPLE 3

Example 2 was repeated, except that the substrate was Rene 95 alloy.

The present invention thus provides a highly versatile tool for fabricating and repairing articles. Although the present invention has been described in connection with specific examples and embodiments, it will be understood by those skilled in the arts involved that the present invention is capable of modification without departing from its spirit and scope as represented by the appended claims.

What is claimed is:

1. A process for fabricating an article using laser welding, the article having a preselected shape and characterized as a plurality of parallel cross sections, each cross section having a preselected pattern and thickness, comprising the steps of:

melting a powder material with a laser beam and depositing the molten material to form a first layer in the pattern of a first cross section of the article, the thickness of the first deposited layer corresponding to the thickness of the first cross section;

melting a powder material with a laser beam and depositing the molten material to form a second layer in the pattern of a second cross section of the article and at least partially overlying the first layer of deposited material, the thickness of the second deposited layer corresponding to the thickness of the second cross section; and melting a powder material with a laser beam and depositing the molten material to form successive layers in patterns of corresponding cross sections of the article, at least one of the successive cross sections partially overlying the underlying cross section and partially offset from the underlying cross section, so that a layer deposited in at least one of the cross sections is partially unsupported by the previously deposited material so as to form an overhang, and further, the thickness of each deposited layer and the thickness of the corresponding cross section in which the layer is deposited being about equal, the layers deposited in successive cross sections until the article is complete.

2. The process of claim 1, wherein the article is curved.

3. The process of claim 1, wherein in the step of melting a powder material with a laser beam and depositing the molten material to form successive layers, the deposited material of a successive layer is different from the material of the previously deposited layer.

4. The process of claim 1, wherein the article is selected from the group consisting of compressor blades, turbine blades and fan blades.

5. The process of claim 1, wherein in the step of melting a powder material with a laser beam and depositing the molten material to form successive layers, a portion of the previously deposited material is melted forming a welded bond between layers.

6. The process of claim 1, wherein a material used in the layers is selected from the group consisting of a titanium alloy, a nickel alloy, a cobalt alloy, an iron alloy, a ceramic, and a plastic.

7. The process of claim 1 wherein in the step of melting a powder material with a laser beam and depositing the molten material to form a second layer, a portion of the first layer is melted, forming a welded bond between the two layers.

8. A process for fabricating an article using laser welding, the article having a preselected complex curved shape and characterized as a plurality of parallel cross sections, each cross section having a preselected pattern and thickness, comprising the steps of:

melting a powder material with a laser beam and depositing the molten material on a substrate to form a first bead of material in the pattern of a first cross section of the article, the thickness of the first deposited bead corresponding to the thickness of the first cross section; and melting a powder material with a laser beam and depositing the molten material as successive beads of material in successive deposition steps, each successive bead deposited in a pattern of a corresponding cross section of the article, each cross section partially overlying the underlying cross section and partially offset from the underlying cross section, and further, so that each deposited bead after the first deposited bead is partially unsupported by the underlying material, the thickness of the deposited material and the thickness of the corresponding cross section in which the material is deposited being about equal, the successive beads deposited in successive cross sections until the complex, curved article is complete.

9. The process of claim 8 wherein the steps of melting the powder material and depositing the molten material in patterns of corresponding cross sections of the article is controlled by a computer, and the pattern of parallel cross sections is stored in the computer.

10. The process of claim 8, wherein the article is doubly curved.

11. The process of claim 8, wherein in at least one instance in the step of melting and depositing successive beads of material overlying each other, the succeeding bead is a different material than the previously deposited bead.

12. The process of claim 8, wherein the article is a compressor blade integrally joined to a compressor disk.

13. The process of claim 8, wherein in the step of melting and depositing successive beads of material overlying each other, during the deposition of the overlying bead, a portion of the previously deposited bead is melted, forming a welded bond between the previously deposited bead and the overlying bead.

14. The process of claim 8, wherein a material used in the beads is selected from the group consisting of a titanium alloy, a nickel alloy, a cobalt alloy, and an iron alloy.

15. A process for fabricating a compressor blade that is integral with a compressor disk using laser welding, the compressor blade having a preselected complex curved shape and characterized as a plurality of parallel cross sections, each cross section having a preselected pattern and thickness, comprising the steps of:

furnishing a compressor disk having a substrate surface at its periphery;

melting a powder material with a laser beam and depositing the molten material onto the substrate surface to form a first bead of material in the pattern of a first cross section of the blade, the thickness of the first deposited bead corresponding to the thickness of the first cross section; and melting a powder material with a laser beam and depositing the molten material as successive beads of material in successive deposition steps, each successive bead deposited in a pattern of a corresponding cross section of the blade, each cross section partially overlying the underlying cross section and partially offset from the underlying cross section so that each deposited bead after the first deposited bead is partially unsupported by the previously deposited material, the thickness of the deposited bead and the thickness of the corresponding cross section in which the material is deposited being about equal, the successive beads deposited in successive cross sections until the compressor blade is complete.

16. The process of claim 15, wherein a material used in the beads is selected from the group consisting of a titanium alloy, a nickel alloy, a cobalt alloy, and an iron alloy.

17. The process of claim 15, wherein in the step of melting a powder material and depositing the molten material as successive beads, during the deposition of each successive bead, a portion of the previously deposited bead is melted forming a welded bond between the beads.

18. The process of claim 15, wherein during the step of depositing the first bead of material onto the substrate surface, a portion of the substrate surface is melted, forming a welded bond between the substrate surface and the first bead.

19. The process of claim 8 wherein in at least one bead, different compositions of powder material are melted and deposited within the same bead.

furnishing a turbine disk having a substrate surface at its periphery.

20. The process of claim 8 wherein in at least one bead, different and continuously variable compositions of material are deposited within the same bead.

21. A process for fabricating a turbine blade that is integral with a turbine disk using laser welding, the turbine blade having a preselected complex curved shape and characterized as a plurality of parallel cross sections, each cross section having a preselected pattern and thickness, comprising the steps of:

furnishing a turbine disk having a substrate surface at its periphery;

melting a powder material with a laser beam and depositing the molten material onto the substrate surface to form a first bead of material in the pattern of a first cross section of the blade, the thickness of the first deposited bead corresponding to the thickness of the first cross section; and melting a powder material with a laser beam and depositing the molten material onto the substrate surface to form a first bead of material in the pattern of a first cross section of the blade, the thickness of the first deposited bead corresponding to the thickness of the first cross section; and melting a powder material with a laser beam and depositing the molten material as successive beads of material in successive deposition steps, each successive bead deposited in a pattern of a corresponding cross section of the blade, each cross section partially overlying the underlying cross section and partially offset from the underlying cross section so that each deposited bead after the first deposited bead is partially unsupported by the previously deposited material, the thickness of the deposited bead and the thickness of the corresponding cross section in which the material is deposited being about equal, the successive beads deposited in successive cross sections until the turbine blade is complete.

22. A process for fabricating a fan blade that is integral with a fan disk using laser welding, the fan blade having a preselected complex curved shape and characterized as a plurality of parallel cross sections, each cross section having a preselected pattern and thickness, comprising the steps of:

furnishing a fan disk having a substrate surface at its periphery;

melting a powder material with a laser beam and depositing the molten material onto the substrate surface to form a first bead of material in the pattern of a first cross section of the blade, the thickness of the first deposited bead corresponding to the thickness of the first cross section; and melting a powder material with a laser beam and depositing the molten material as successive beads of material in successive deposition steps, each successive bead deposited in a pattern of a corresponding cross section of the blade, each cross section partially overlying the underlying cross section and partially offset from the underlying cross section so that each deposited bead after the first deposited bead is partially unsupported by the previously deposited material, the thickness of the deposited bead and the thickness of the corresponding cross section in which the material is deposited being about equal, the successive beads deposited in successive cross sections until the fan blade is complete.

* * * * *